US012669765B2

(12) United States Patent
Kojima

(10) Patent No.: US 12,669,765 B2
(45) Date of Patent: Jun. 30, 2026

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventor: Hiroomi Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 18/918,203

(22) Filed: Oct. 17, 2024

(65) Prior Publication Data

US 2025/0138453 A1 May 1, 2025

(30) Foreign Application Priority Data

Oct. 27, 2023 (JP) ................................ 2023-184603

(51) Int. Cl.
*G03G 15/16* (2006.01)
*G03G 15/01* (2006.01)

(52) U.S. Cl.
CPC ....... *G03G 15/162* (2013.01); *G03G 15/0131* (2013.01); *G03G 15/0189* (2013.01)

(58) Field of Classification Search
CPC .. G03G 15/16; G03G 15/162; G03G 15/0131; G03G 15/0189
See application file for complete search history.

(56) References Cited

U.S. PATENT DOCUMENTS 9,753,411 B2 9/2017 Uchida et al.
9,933,713 B2 4/2018 Uchida
11,586,132 B2 2/2023 Kojima
11,803,136 B2 10/2023 Kojima
11,971,669 B2 4/2024 Kojima
2019/0317431 A1* 10/2019 Ishio .................... G03G 15/161
(Continued)

FOREIGN PATENT DOCUMENTS

JP 2003248353 A * 9/2003
JP 2014-149445 A 8/2014
JP 2015-230456 A 12/2015

OTHER PUBLICATIONS

Hirayanagi et al., U.S. Appl. No. 18/826,519, filed Sep. 6, 2024.

*Primary Examiner* — Thomas S Giampaolo, II
(74) *Attorney, Agent, or Firm* — Venable LLP

(57) ABSTRACT

An electrophotographic member with an endless shape, the electrophotographic member comprising: a cylindrical film; and a surface layer on an outer circumferential surface of the cylindrical film, wherein the cylindrical film comprises: a shrinkage rate αp in a first direction serving as a circumferential direction of the cylindrical film and a shrinkage rate αa in a second direction orthogonal to the circumferential direction, both of which are 2.0% or more; and a crystalline polyester as a binder, and roughness forming particles dispersed in the binder, the surface layer includes protruded portions caused by the roughness forming particles on an outer surface opposite to a surface facing the cylindrical film, and the cylindrical film further comprises an amorphous polyester, and the amorphous polyester extends in the first direction and the second direction around at least the roughness forming particles.

11 Claims, 4 Drawing Sheets

(56) References Cited

U.S. PATENT DOCUMENTS

| | | | | |
|---|---|---|---|---|
| 2023/0297009 A1* | 9/2023 | Kojima | ................ | G03G 15/162 399/302 |
| 2024/0219861 A1 | 7/2024 | Kojima | | |
| 2025/0093798 A1* | 3/2025 | Hirayanagi | .......... | G03G 15/162 |

* cited by examiner

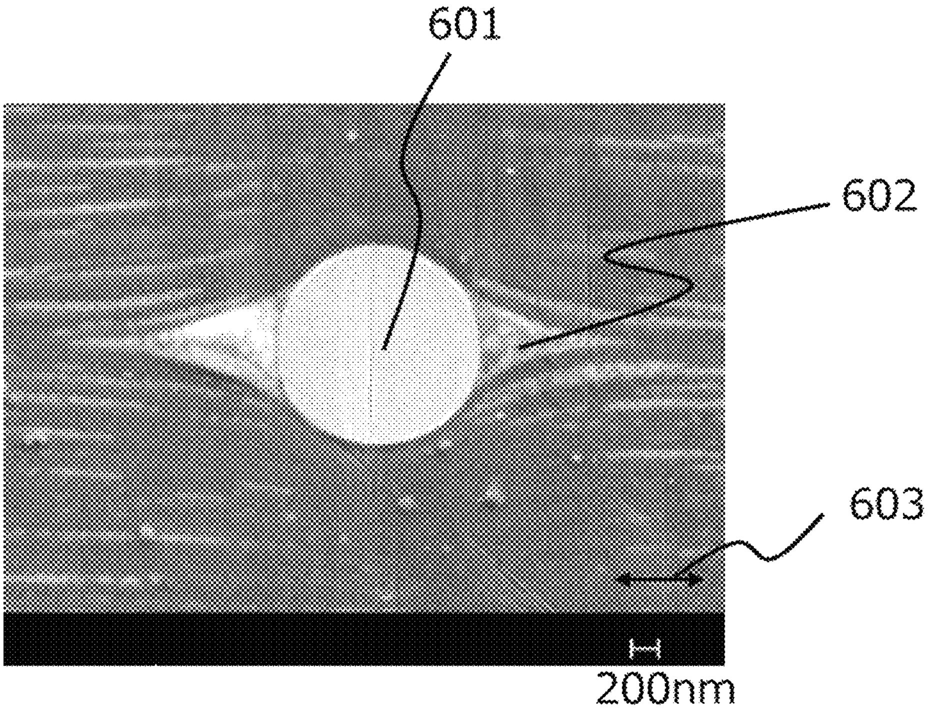
FIG. 6
FIG.7A
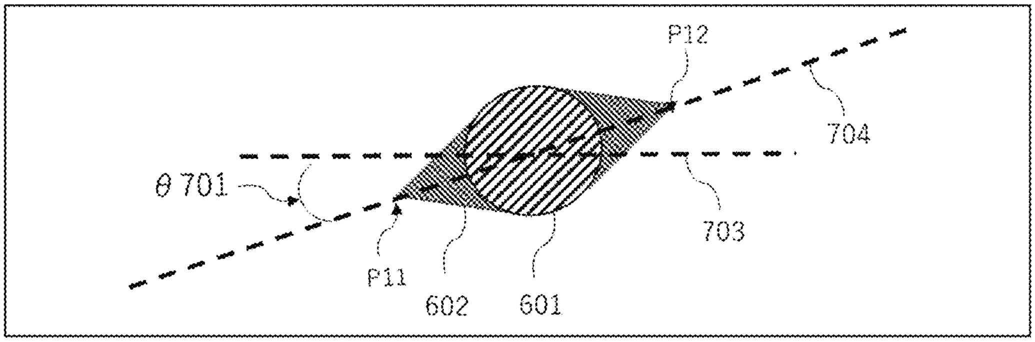
FIG.7B
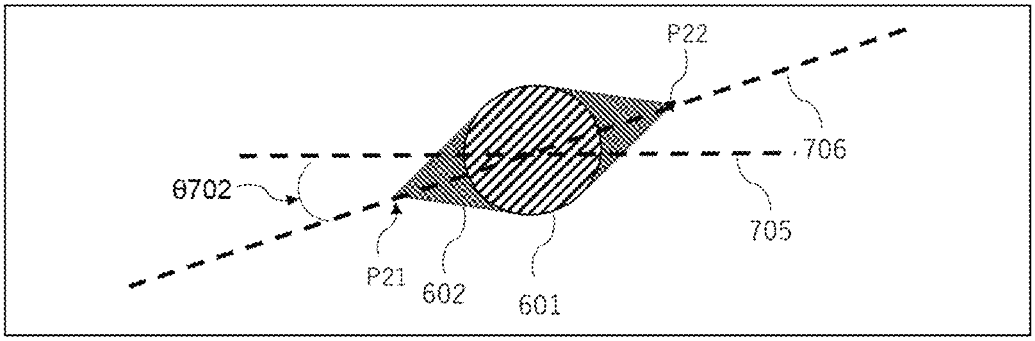

ELECTROPHOTOGRAPHIC MEMBER AND ELECTROPHOTOGRAPHIC IMAGE FORMING APPARATUS

BACKGROUND OF THE INVENTION

Field of the Invention

The present disclosure relates to an electrophotographic member and an electrophotographic image forming apparatus including the electrophotographic member.

Description of the Related Art

In an electrophotographic image forming apparatus, an electrophotographic belt that is made of a thermoplastic resin and has an endless shape is used as a conveyance transfer belt that conveys a transfer material or as an intermediate transfer belt. Such an electrophotographic belt is demanded to have high strength and conductivity within a range of $1\times10^{3}$ to $1\times10^{13}\Omega/\square$ in surface resistance, for example.

Japanese Patent Application Publication No. 2015-230456 discloses a conductive belt including a matrix containing a thermoplastic resin having an ester bond, an ionic liquid, and particles containing a silicone resin, and capable of sufficiently reducing a variation in electric resistance over time.

Furthermore, it is disclosed in Examples 1 to 7 of Japanese Patent Application Publication No. 2015-230456 that a conductive belt is obtained by blow molding a preform produced from a resin composition containing a thermoplastic polyester resin (polyethylene terephthalate) and silicone resin particles having an average particle diameter of 2 μm, and cutting both ends of a blow bottle obtained by the blow molding.

Japanese Patent Application Publication No. 2014-149445 discloses a tubular body formed by extruding a mixed resin, containing a crystalline thermoplastic resin and an amorphous thermoplastic resin, into a cylindrical shape.

SUMMARY OF THE INVENTION

At least one aspect of the present disclosure is directed to providing an electrophotographic member that contributes to stable formation of a high-quality electrophotographic image even though the electrophotographic member is repeatedly used. At least one aspect of the present disclosure is also directed to providing an electrophotographic image forming apparatus capable of forming a high-quality electrophotographic image.

According to at least one aspect of the present disclosure, an electrophotographic member with an endless shape is provided, the electrophotographic member comprising: a cylindrical film; and a surface layer on an outer circumferential surface of the cylindrical film, in which the cylindrical film further comprises: a shrinkage rate $\alpha p$ in a first direction serving as a circumferential direction of the cylindrical film and a shrinkage rate $\alpha a$ in a second direction orthogonal to the circumferential direction, both of which are 2.0% or more; and a crystalline polyester as a binder, and roughness forming particles dispersed in the binder, the surface layer includes protruded portions caused by the roughness forming particles on an outer surface opposite to a surface facing the cylindrical film, and the cylindrical film further comprises an amorphous polyester, and the amorphous polyester extends in the first direction and the second direction around at least the roughness forming particles.

In addition, according to at least one aspect of the present disclosure, an electrophotographic image forming apparatus is provided, the electrophotographic image forming apparatus comprising the electrophotographic member as an intermediate transfer belt.

According to the at least one aspect of the present disclosure, it is possible to provide the electrophotographic member that contributes to stable formation of a high-quality electrophotographic image even though the electrophotographic member is repeatedly used. According to the at least one aspect of the present disclosure, it is also possible to provide the electrophotographic image forming apparatus capable of forming a high-quality electrophotographic image. Further features of the present invention will become apparent from the following description of exemplary embodiments with reference to the attached drawings.

BRIEF DESCRIPTION OF THE DRAWINGS

FIG. 6 is a schematic image around a coarse particle included in the electrophotographic belt according to an aspect of the present disclosure; and FIGS. 7A and 7B are explanatory views of a method for determining the extension of an amorphous polyester centered on a roughness forming particle.

DESCRIPTION OF THE EMBODIMENTS

Figure 1:
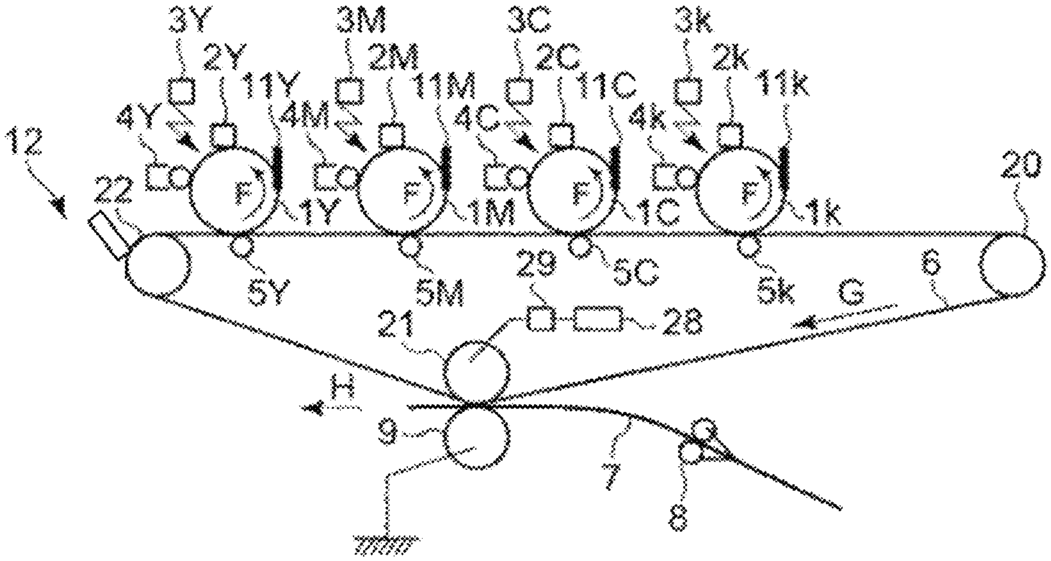
FIG. 1 is a schematic cross-sectional view illustrating an example of a full-color electrophotographic image forming apparatus using an electrophotographic process.

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

In the present disclosure, "$\Omega/\square$" is a unit of surface resistivity defined in the Japanese Industrial Standards (JIS) K 6911:2006, and means "Ω/square".

An electrophotographic belt disclosed in Japanese Patent Application Publication No. 2015-230456 is surface-roughened by the formation of protruded portions on an outer surface of the electrophotographic belt with particles containing a silicone resin having an average particle diameter of 2 μm, and can reduce sliding friction with a cleaning member such as a cleaning blade, for example. In addition, an electrophotographic belt with an endless shape, which is produced using a biaxially stretched bottle formed by carrying out stretch molding on a preform with a test tube shape in two directions of a longitudinal direction and a radial direction thereof, can have a high elastic modulus and high strength because of being stretched (biaxially stretched) in a circumferential direction and a longitudinal direction orthogonal to the circumferential direction.

However, based on the study by the present inventors, in a case where a conductive belt according to Japanese Patent Application Publication No. 2015-230456 is repeatedly used to form an electrophotographic image, blank dots may gradually occur in the electrophotographic image. Upon observing positions of the outer surface of the electrophotographic belt corresponding to the blank dots in the electrophotographic image, it has been confirmed that the outer circumferential surface of the electrophotographic belt was partially peeled off to generate very fine level differences. A cross-section in a direction along the circumferential direction and a cross-section in a direction along the longitudinal direction of the electrophotographic belt were also observed with a scanning electron microscope (SEM). As a result, voids were observed around a silicone resin particle. In particular, there were voids extending in each of the circumferential direction and the longitudinal direction of the electrophotographic belt around the silicone resin particle. From these observation results, it was presumed that the partial peeling of the outer circumferential surface of the electrophotographic belt described above was caused by a decrease in adhesion between the silicone resin particles and a binder around the silicone resin particles because of the presence of voids around the silicone resin particles. Specifically, this is considered because the outer circumferential surface of the electrophotographic belt is repeatedly rubbed with the cleaning member or other components, so that the electrophotographic belt is selectively peeled off from void portions around the silicone resin particles having a weak binding force.

In addition, the reason why the voids are present around the silicone resin particles contained in the electrophotographic belt, particularly, in the circumferential direction and the longitudinal direction of the electrophotographic belt around the silicone resin particles is considered as follows. In a base layer, the molecules of crystalline thermoplastic polyester are oriented and crystallized. In such a crystal growth process, the crystalline thermoplastic polyester hardens as the crystallization of the crystalline thermoplastic polyester proceeds. Thus, the crystalline thermoplastic polyester present around a roughness forming particle such as a silicone resin particle, which has the size (micron order) to such an extent that a protruded portion can be produced on the outer surface cannot sufficiently follow the shape of the roughness forming particle. In addition, as the crystallization of the crystalline thermoplastic polyester proceeds, the adhesiveness to the roughness forming particle also decreases. As a result, it is presumed that the voids are formed in the circumferential direction and the longitudinal direction of the electrophotographic belt around the roughness forming particle. Such presumption is considered to be correct also from the fact that the voids extend in the radial direction around the roughness forming particle in a case where the outer surface of the electrophotographic member is viewed from above, and specifically, the voids have, for example, a sombrero shape around the roughness forming particle.

Based on such considerations, the present inventors have repeatedly studied to obtain an electrophotographic member that has no voids occurring around the roughness forming particle, with an attempt to improve the strength by orienting and crystallizing the molecules of the crystalline polyester. As a result, the present inventors have found that an electrophotographic member that has high strength, reduces the formation of voids around a roughness forming particle, and hardly causes peeling of the outer surface even after long-term use can be obtained by further blending an amorphous polyester in a cylindrical film containing a crystalline polyester.

Specifically, an electrophotographic member according to an aspect of the present disclosure has an endless shape and includes a cylindrical film and a surface layer on an outer circumferential surface of the cylindrical film.

The cylindrical film has a shrinkage rate $\alpha p$ in a first direction serving as a circumferential direction of the cylindrical film and a shrinkage rate $\alpha a$ in a second direction orthogonal to the circumferential direction, both of which are 2.0% or more, contains a crystalline polyester as a binder, and further contains roughness forming particles dispersed in the binder. The surface layer also includes protruded portions caused by the roughness forming particles on an outer surface opposite to the surface facing the cylindrical film. Furthermore, the cylindrical film includes an amorphous polyester, and the amorphous polyester extends in the first direction and the second direction around at least the roughness forming particle.

The present inventors presume the reason why the formation of the voids around the roughness forming particle in the cylindrical film having the above configuration is reduced as follows.

In the crystal growth process of a crystalline polyester, in which the molecules are regularly aligned, other components such as the amorphous polyester contained in the cylindrical film are extruded from the crystalline part. In addition, as the crystallization of the crystalline polyester proceeds, voids are formed around a roughness forming particle for the reasons described above. Furthermore, it is considered that the amorphous polyester extruded from the crystalline part of the crystalline polyester is disposed to fill voids around the roughness forming particle. As a result, the configuration without voids around the roughness forming particle or with the reduced number of voids around the roughness forming particle can be achieved. As a result, it is considered that peeling of the outer surface of the electrophotographic member can be effectively controlled even though the friction from a cleaning blade or other components occurs in a case where the electrophotographic member is repeatedly used.

Hereinafter, the electrophotographic member according to the aspect of the present disclosure will be described in detail. Note that the present disclosure is not limited to the following aspect.

Electrophotographic Member

An electrophotographic member includes a cylindrical film and a surface layer on an outer circumferential surface of the cylindrical film.

Figure 5A:
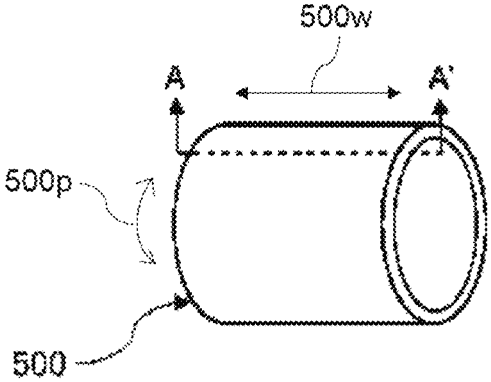
FIGS. 5A and 5B are explanatory views of a configuration example of an electrophotographic belt according to an aspect of the present disclosure.
Figure 5B:
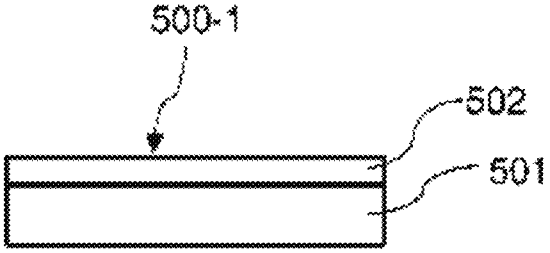

FIG. 5A illustrates a perspective view of an electrophotographic member (hereinafter, also referred to as an "electrophotographic belt") 500 with an endless shape, in accordance with at least one aspect of the present disclosure. As an example of the layer configuration, a cross-section taken along line A-A' in FIG. 5A includes a base layer 501 including a cylindrical film and a surface layer 502 covering an outer circumferential surface of the base layer as illustrated in FIG. 5B. In FIG. 5A, an arrow 500*p* represents the circumferential direction of the electrophotographic belt, and an arrow 500*w* represents the longitudinal direction orthogonal to the circumferential direction of the electrophotographic belt. In a case where the electrophotographic belt having such a configuration is used as, for example, an intermediate transfer belt, an outer surface 500-1 of the surface layer 502 serves as a toner carrying surface. An inner circumferential surface of the cylindrical film may also constitute an inner peripheral surface of the electrophotographic member.

The electrophotographic member may include a layer other than the base layer and the surface layer.

Cylindrical Film

The cylindrical film contains a crystalline polyester as a binder, roughness forming particles dispersed in the binder, and an amorphous polyester. The cylindrical film can be, for example, a molded article formed of a resin mixture containing a crystalline polyester, roughness forming particles, and an amorphous polyester.

The cylindrical film has a shrinkage rate αp in a first direction serving as a circumferential direction of the cylindrical film and a shrinkage rate αa in a second direction orthogonal to the circumferential direction, both of which are 2.0% or more. Furthermore, the amorphous polyester extends in the first direction and the second direction around at least a roughness forming particle, so that the peeling can be controlled even under repeated use.

As described above, since the electrophotographic member according to the present disclosure can reduce the peeling of the surface even under repeated use, the electrophotographic member contributes to stable formation of a high-quality electrophotographic image.

Both a tensile elastic modulus Ep of the cylindrical film in the circumferential direction (first direction) and a tensile elastic modulus Ea of the cylindrical film in the direction (second direction) orthogonal to the circumferential direction are preferably 1000 MPa or more. As described above, the electrophotographic belt is tightly stretched by a plurality of rollers at a predetermined tension in an electrophotographic image forming apparatus. Here, elongation and breakage can be prevented by setting Ep to 1000 MPa or more. Ep is more preferably 1100 MPa or more, and still more preferably 1200 MPa. The upper limit of Ep is not particularly limited, and is, for example, 2000 MPa or less, 1800 MPa or less, or 1600 MPa or less. That is, Ep is preferably 1000 to 2000 MPa, 1100 to 1800 MPa, or 1200 to 1600 MPa.

In addition, a predetermined tension in the circumferential direction is applied to induce a compressive force in the direction orthogonal to the circumferential direction of the electrophotographic member. In this regard, by setting Ea to 1000 MPa or more, the occurrence of cockling along the circumferential direction on the outer surface of the electrophotographic member due to the compressive force can be more reliably reduced, and the electrophotographic member can be stably driven. Ea is more preferably 1100 MPa or more, and still more preferably 1200 MPa. The upper limit of Ea is not particularly limited, and is, for example, 2000 MPa or less, 1800 MPa or less, or 1600 MPa or less. That is, Ea is preferably 1000 to 2000 MPa, 1100 to 1800 MPa, or 1200 to 1600 MPa.

The above-described tensile elastic modulus Ep and Ea can be controlled by the degree of orientation of the crystalline polyester in the circumferential direction of the cylindrical film and the direction orthogonal to the circumferential direction. The orientation degree of the crystalline polyester can be expressed by the shrinkage rate αp in the circumferential direction of the cylindrical film and the shrinkage rate αa in the direction orthogonal to the circumferential direction.

As described above, both αp and αa are 2.0% or more. In the cylindrical film having αp and αa, both of which are 2.0% or more, the crystalline polyester is sufficiently oriented in the circumferential direction of the cylindrical film and the direction orthogonal to the circumferential direction. Therefore, in a case where the belt is tightly stretched with tension, the deformation of the belt can be reduced by the shrinkage stress acting thereon. The cylindrical film having such shrinkage rates can have the tensile elastic modulus Ep and Ea of 1000 MPa or more as described above.

αp may be, for example, 2.00 to 6.50%, 2.00 to 6.00%, or 2.00 to 5.50%. αa may be, for example, 2.00 to 6.50%, 2.00 to 6.00%, or 2.00 to 5.50%.

The thickness of the cylindrical film is not particularly limited. However, since the cylindrical film is disposed in the electrophotographic image forming apparatus in a bent state, the thickness is preferably 40 μm to 500 μm, and particularly preferably 50 μm to 100 μm from the viewpoint of ensuring flexibility.

Crystalline Polyester

The crystalline polyester refers to, for example, a polyester showing a clear endothermic peak in differential scanning calorimetry (DSC) measurement.

The crystalline polyester can be obtained by polycondensation of a dicarboxylic acid and a diol, polycondensation of an oxycarboxylic acid or a lactone, polycondensation using a plurality of these components, or other reactions. Other components may be used, and for example, a polyfunctional monomer may be used in combination. The crystalline polyester may be a homopolyester containing one ester bond or a copolyester (copolymer) containing a plurality of ester bonds.

From the viewpoint of having high crystallinity and exhibiting excellent heat resistance, the crystalline polyester preferably contains at least one selected from the group consisting of polyalkylene terephthalate, polyalkylene naphthalate, polyalkylene isophthalate, and copolymers containing these, and more preferably at least one selected from the group consisting of polyalkylene terephthalate, polyalkylene naphthalate, and copolymers containing these. A copolymer of polyalkylene naphthalate and polyalkylene isophthalate can also be suitably used.

The number of carbon atoms in the alkylene in polyalkylene terephthalate, polyalkylene naphthalate, and polyalkylene isophthalate is preferably 2 to 16, more preferably 2 to 8, and still more preferably 2 to 4, because a crystalline polyester having high crystallinity and high heat resistance can be obtained.

More specifically, examples of the crystalline polyester include at least one crystalline polyester selected from the group consisting of polyethylene terephthalate (PET), polyethylene naphthalate (PEN), and polyethylene isophthalate, and modified polyethylene terephthalate, modified polyethylene naphthalate, and modified polyethylene isophthalate, which are obtained by modifying some of the blocks of the above polyesters with other blocks. Here, examples of the other blocks include a monomer unit containing at least one compound selected from the group consisting of 1,4-naphthalenedicarboxylic acid, 2,3-naphthalenedicarboxylic acid, and other compounds. These compounds can be used singly or in combination of two or more kinds thereof. A blend or an alloy may be used, and other resins may be added.

The molecular weight of the crystalline polyester is not particularly limited, and the weight-average molecular weight for PET is preferably 50,000 to 80,000, for example.

In addition, the weight-average molecular weight for PEN is preferably 20,000 to 80,000.

The content proportion of the crystalline polyester in the cylindrical film is preferably 50.0 mass % or more, and more preferably 60.0 mass % or more with respect to the total mass of the cylindrical film. The upper limit is not particularly limited, but may be 95.0 mass % or less or 90.0 mass % or less. Preferable examples include 50.0 to 95.0 mass % and 60.0 to 90.0 mass %.

Since the content ratio of the crystalline polyester is set within the above-described range, a sufficient amount of the crystalline polyester can be oriented in the circumferential direction of the cylindrical film and the direction orthogonal to the circumferential direction, and the mechanical strength of the cylindrical film can be more reliably enhanced.

The content proportion of the crystalline polyester in the cylindrical film can be determined, for example, by the following method. A sample (for example, 1 mm square×the total thickness of the cylindrical film) collected from the cylindrical film is immersed in methyl ethyl ketone at a temperature of 23° C. to be separated into a soluble matter (amorphous polyester) and insoluble matters (crystalline polyester, roughness forming particles, and other matters). Next, the obtained insoluble matter is immersed in hexafluoroisopropanol (HFIP) at a temperature of 25° C. to dissolve the crystalline polyester in HFIP, and is separated from an insoluble matter (roughness forming particles). The HFIP is removed from the obtained solution containing HFIP and the crystalline polyester, and the crystalline polyester as a residue is weighed.

In addition, the crystalline polyester obtained by the above-described method is subjected to differential scanning calorimeter (DSC), pyrolysis GC/MS, IR, NMR, and elemental analysis to determine a chemical structure and other properties of the crystalline polyester.

Amorphous Polyester

The amorphous polyester refers to, for example, a polyester showing no clear endothermic peak in differential scanning calorimetry (DSC) measurement.

The amorphous polyester is not particularly limited. Examples of the amorphous polyester include a polyester that has a structure corresponding to at least one phthalic acid selected from the group consisting of terephthalic acid, orthophthalic acid, and isophthalic acid, and a structure corresponding to at least two diol selected from the group consisting of ethylene glycol, diethylene glycol, propylene glycol, neopentyl glycol, and cyclohexanedimethanol.

Here, the "corresponding structure" refers to a structure derived from an acid as a raw material in the amorphous polyester and a structure derived from an alcohol. Hereinafter, the same applies to the present disclosure.

Examples thereof include a polycondensate of a copolymer having a structure corresponding to ethylene terephthalate and a structure corresponding to ethylene orthophthalate and the diol, and a polycondensate of a copolymer having a structure derived from ethylene terephthalate and a structure derived from ethylene isophthalate and the diol. These copolymers may include block copolymers or random copolymers. The amorphous polyester may also be used as a polymer alloy in which two or more amorphous polyesters are blended, or may be used as a polymer alloy in which two or more copolymers are blended.

Examples of the amorphous polyester capable of being suitably used include an amorphous polyester having a structure corresponding to terephthalic acid and a structure corresponding to ethylene glycol and propylene glycol. Such amorphous polyesters are commercially available, for example, as "VYLON GK640" and "VYLON GK880" (all of which are trade names, manufactured by TOYOBO Co., Ltd.).

The molecular weight of the amorphous polyester is not particularly limited, and the weight-average molecular weight (Mw) is preferably 8,000 to 60,000, and more preferably 10,000 to 40,000, for example.

In the electrophotographic member, the content ratio of the amorphous polyester to the crystalline polyester is preferably 30.0 mass % or less, and more preferably 20.0 mass % or less. The lower limit is not particularly limited, but is preferably, for example, 2.0 to 30.0 mass %, and particularly preferably 3.0 to 20.0 mass %. Since the content ratio of the amorphous polyester to the crystalline polyester is set within the above-described range, a sufficient amount of the amorphous polyester to fill the voids around the particles can be extended in the cylindrical film.

The content of the amorphous polyester in the cylindrical film can be determined, for example, by the following method. A sample (for example, 1 mm square×the total thickness of the cylindrical film) collected from the cylindrical film is immersed in methyl ethyl ketone (MEK) at a temperature of 23° C. to be separated into a soluble matter (amorphous polyester) and insoluble matters (crystalline polyester, roughness forming particles, and other matters). Next, the MEK is removed from the obtained solution containing MEK and the amorphous polyester, and the amorphous polyester as a residue is weighed.

The amorphous polyester obtained by the above-described method can be subjected to pyrolysis GC/MS, IR, NMR, and elemental analysis to identify the chemical structure of an amorphous polyester resin.

An example of observing the existence state of the amorphous polyester resin in the cylindrical film is illustrated. A sample piece of 5 mm in the circumferential direction and 5 mm in the longitudinal direction orthogonal to the circumferential direction (hereinafter, also simply referred to as the "longitudinal direction") is cut out from any position of the electrophotographic member. A first cross-section of the cut sample piece in a direction along the circumferential direction of the cylindrical film and a second cross-section of the cut sample piece in a direction along the longitudinal direction are subjected to a polishing process using an ion beam. For the cross-section polishing process by the ion beam, for example, a cross-section polisher can be used. In the cross-section polishing process by the ion beam, mixing of a polishing agent can be prevented, and a cross-section with few polishing marks can be formed.

Subsequently, for the polished first cross-section and second cross-section of the sample piece, amorphous polyester portions are stained, the staining being performed with ruthenium tetroxide which enables the amorphous polyester portions to be distinguished from crystalline polyester portions. The first cross-section and the second cross-section of the stained sample piece are observed by scanning electron microscope (SEM) observation or other ways, one of roughness forming particles exposed on each cross-section is focused, and a cross-sectional image of a 10 μm×10 μm region including the focused roughness-formed particle and the periphery thereof is acquired. The staining is performed in advance in this way to enable the contrast in the observation image to be easily obtained, and the existence state of the amorphous polyester can be more accurately evaluated.

FIG. 6 illustrates an example of an SEM image obtained from the first cross-section. As illustrated in FIG. 6, the amorphous polyester included in a region 602 extends in a circumferential direction (first direction 603) of a cylindrical film and a direction (second direction) orthogonal to the circumferential direction around a roughness forming particle 601. The region (amorphous portion) 602 including the amorphous polyester preferably extends from the centered roughness forming particle 601 toward the first direction 603 and the second direction to form a substantially triangular shape tapering from the roughness forming particle 601 toward the first direction 603. More specifically, when the roughness forming particle 601 on an outer surface of the electrophotographic member and the periphery thereof are viewed from above and the outer surface of the electrophotographic member, it is preferable that the region 602 has a so-called "sombrero" shape in which the region 602 extends in the entire circumferential direction around the roughness forming particle 601. As described above, the amorphous polyester resin exists around roughness forming particles, and voids are less likely to exist around the roughness forming particles. As a result, it is considered that the binding force between the roughness forming particles and the binder hardly decreases, and peeling thus hardly occurs on the outer surface even though the electrophotographic member is repeatedly used. Such extension of the amorphous polyester can be achieved by producing a cylindrical film with a method for producing a cylindrical film described later.

In the present disclosure, it can be confirmed, for example, by the following method that the amorphous polyester exists to extend in the first direction and the second direction around the roughness forming particle.

A test piece is cut out from any portion of the electrophotographic belt, the test piece having a length of 5 mm in a direction along the circumferential direction of the electrophotographic belt, a length of 5 mm in a direction along the longitudinal direction orthogonal to the circumferential direction, and a thickness equal to the total thickness of the electrophotographic belt. Each of a first cross-section of the obtained test piece in a direction along the circumferential direction of the electrophotographic belt and a second cross-section of the obtained test piece in a direction along the longitudinal direction is polished using a cross-section polisher.

The polished first cross-section and second cross-section of the test piece are stained with ruthenium tetroxide, which can stain amorphous portions. Next, the first cross-section and the second cross-section are observed by scanning electron microscope (SEM) observation, one of roughness forming particles is focused, and an SEM image of a 10 μm×10 μm region including the roughness-formed particle and the periphery thereof is acquired. In this case, the focused roughness forming particle is not particularly limited, but it is preferable to select a roughness forming particle in which the maximum length of the cross-section of the roughness forming particle exposed on the observed cross-section (first cross-section, second cross-section) is as close as possible to the diameter of the roughness forming particle, and particularly, it is preferable to select a roughness forming particle in which the maximum length is equal to the diameter of the roughness forming particle.

In the acquired SEM image, the stained region is determined as a region containing the amorphous polyester. FIG. 7A focuses on one roughness forming particle 601 exposed at the first cross-section, and illustrates an example of an SEM image of the roughness forming particle 601 and the 10 μm×10 μm region including the periphery thereof. In this SEM image, the stained region 602 is the region where the amorphous polyester exists. Here, two points P11 and P12 at both ends of the region 602 extending in the first direction (see the arrow 500*p* in FIG. 5A) along the circumferential direction around the roughness forming particle are specified. Then, an angle (acute angle) θ701 that is formed with a line segment 704 connecting the points P11 and P12 and a straight line 703 drawn parallel to the circumferential direction is measured. In a case where θ701 is 10° or less, it is assumed that the region 602 extends in the first direction around the roughness forming particle. θ701 is preferably 5° or less, and particularly preferably 2° or less. The lower limit of θ701 is not particularly limited, but is preferably 0°. θ701 is preferably within a range of 0° to 10°, still more preferably within a range of 0° to 5°, and particularly preferably within a range of 0° to 2°.

For the extension of the amorphous polyester in the second direction, an SEM image is obtained from the second cross-section in the same manner as described above. FIG. 7B focuses on one roughness forming particle 601 exposed at the second cross-section, and illustrates an example of an SEM image of the roughness forming particle 601 and the 10 μm×10 μm region including the periphery thereof. In this SEM image, the stained region 602 is the region where the amorphous polyester exists. Here, two points P21 and P22 at both ends of the region 602 extending in the longitudinal direction, that is, the second direction (see the arrow 500*w* in FIG. 5A) around the roughness forming particle 601 are specified. Then, an angle (acute angle) θ702 that is formed with a line segment 706 connecting the points P21 and P22 and a straight line 705 drawn parallel to the longitudinal direction is measured. In a case where θ702 is 10° or less, it is assumed that the region 602 extends in the second direction around the roughness forming particle. θ702 is preferably 5° or less, and particularly preferably 2° or less. The lower limit of θ702 is not particularly limited, but is preferably 0°. θ702 is preferably within a range of 0° to 10°, still more preferably within a range of 0° to 5°, and particularly preferably within a range of 0° to 2°.

As a method for controlling θ701 and θ702 within the above-described ranges, for example, in a case where a preform with a test tube shape is biaxially stretched, the preform is more accurately stretched in a direction along the longitudinal direction and in a radial expansion direction. Specific examples of the method include uniformly heating the preform during biaxial stretching molding.

Roughness Forming Particles

The roughness forming particles are particles having an action of imparting unevenness to the outer surface (toner image carrying surface) of the cylindrical film to control the toner. Since the cylindrical film contains the roughness forming particles, protruded portions caused by the roughness forming particles can be produced on the outer surface opposite to the surface facing the cylindrical film in the surface layer on the outer circumferential surface of the cylindrical film.

The roughness forming particles can be confirmed by the observation on the cross-section of the cylindrical film by SEM or other techniques.

The roughness forming particles have various chemical structures, crystal structures, and crystallinity, and various shapes and particle diameters exist according to various polymerization methods and pulverization methods.

As the roughness forming particles, known inorganic fine particles or organic fine particles can be used, and for example, the following particles can be used. Examples thereof include carbonates such as calcium carbonate, barium carbonate, and nickel carbonate; titanates such as potassium titanate, barium titanate, strontium titanate, and lead zirconate titanate; silica particles such as glass beads, zeolites, alumina, ferrites, metal oxides such as magnesium oxide, calcium oxide, zinc oxide, iron oxide, titanium oxide, and tin oxide; sulfates such as barium sulfate and calcium sulfate; metal hydroxides such as magnesium hydroxide and aluminum hydroxide; metal sulfides such as molybdenum sulfide; mineral particles such as kaolin; silicone resin particles; fluoropolymer particles such as PTFE particles, PFPE particles, and PFA particles; aramid particles; thermosetting resin particles, and other particles. These can be used singly or in combination of two or more kinds thereof.

Among the above-described roughness forming particles, silicone resin particles and silica particles, which are excellent in thermal stability, have low surface energy, are less aggregated with each other, and are easily dispersion-controlled, are particularly preferable. That is, it is particularly preferable that the roughness forming particles include at least one of particles selected from the group consisting of silicone resin particles and silica particles.

With regard to the roughness forming particles, the shape and particle diameter are not particularly limited, but it is preferable that the roughness forming particles have a particle diameter enabling the formation of roughness on the surface and are spherical. This is because, in a case where the roughness forming particles are spherical, isotropy is easily achieved in the dispersed or oriented state, and roughness is further easily formed on the surface, as compared with amorphous particles or fibrous materials.

The particle diameter of the roughness forming particles is not particularly limited as long as the surface unevenness of the cylindrical film can be controlled, and for example, a volume average particle diameter may be 0.4 μm or more, and is preferably 1.0 μm or more. Within the above-described range, the surface unevenness of the cylindrical film can be easily controlled. The upper limit of the volume average particle diameter is not particularly limited, and examples thereof include 0.4 to 5.0 μm and 1.0 to 5.0 μm.

In the cylindrical film, the content proportion of the roughness forming particles on a mass basis is not particularly limited, but is preferably 0.1 to 5.0 mass %, and more preferably 0.3 to 2.5 mass %.

Additive

The cylindrical film may contain other components as long as the effects of the present disclosure are not impaired. Examples of other components include antioxidants, ultraviolet absorbers, organic pigments, inorganic pigments, pH adjusters, crosslinking agents, compatibilizers, release agents, coupling agents, lubricants, and other components. These additives may be used singly or may be used in combination of two or more thereof. The use amount of the additive can be appropriately set, and is not particularly limited.

The cylindrical film may contain a conducting agent. Examples of the conducting agent include an electron conducting agent such as carbon black and an ionic conducting agent. Examples of the ionic conducting agent include an ionic liquid. The ionic liquid refers to a salt composed of an anion and a cation, which exhibits a melting point at a temperature of 100° C. or lower. Specific examples of the ionic conducting agent include lithium bis(trifluoromethanesulfonyl)imide, lithium bis(fluorosulfonyl)imide, and other ionic conducting agents, classified as the ionic liquid. In the configuration according to the present disclosure, it is considered that the ionic conducting agent is contained in a large amount in the region 602 containing the amorphous polyester in FIGS. 7A and 7B. In a process of the crystallization of the crystalline polyester proceeding, extrusion from the crystalline part occurs as with the amorphous polyester. As a result, it is considered that the ionic conducting agent exists in a large amount in the region 602.

For example, in a case where the cylindrical film contains the ionic conducting agent, the content ratio of the ionic conducting agent is not particularly limited, but is preferably, for example, 0.5 to 8.0 mass %, based on the mass of the cylindrical film.

A surface resistivity A (Ω/A) of the electrophotographic member, which is measured at the inner surface of the electrophotographic member under an environment of a temperature of 23° C. and a relative humidity of 50%, is preferably $1.00\times10^{3}$ to $1.00\times10^{13}$ Ω/□, more preferably $1.00\times10^{5}$ to $1.10\times10^{12}$ Ω/□, and still more preferably $1.00\times10^{7}$ to $1.10\times10^{11}$ Ω/□.

Surface Layer

The electrophotographic member includes a surface layer on the outer circumferential surface of the cylindrical film. The surface layer includes protruded portions caused by the roughness forming particles on the outer surface opposite to the surface facing the cylindrical film. As described above, since the electrophotographic member includes the surface layer having the protruded portions, friction with a photosensitive drum and a cleaning member can be reduced. The existence of the protruded portions can be confirmed by a method described later.

The surface layer is not particularly limited, and examples thereof include a layer having excellent abrasion resistance, the layer including a cured product of an active energy ray-curable resin. Such a surface layer can be provided, for example, by applying a composition containing an active energy ray-curable resin such as a photocurable resin on the outer circumferential surface of the cylindrical film, and curing the composition by irradiation of the composition with ultraviolet rays or other light sources.

The thickness of the surface layer is not particularly limited, but is preferably, for example, 1 to 5 μm.

The photocurable resin is not particularly limited as long as it is a resin having a photocurable functional group in the molecule, and examples thereof include resins including a vinyl group, a propenyl group, an allyl group, a styryl group, an acryloyl group, a methacryloyl group, a maleimide group, and the like. Further, the photocurable resin is preferably a polyfunctional photocurable resin, such as glycerin di(meth)acrylate, trimethylolpropane di(meth)acrylate, pentaerythritol tri(meth)acrylate, diglycerin tri(meth)acrylate, sorbitan tri(meth)acrylate, dipentaerythritol penta(meth)acrylate, dipentaerythritol penta and hexa(meth)acrylate, tetraglycerin penta(meth)acrylate, and the like. Among them, dipentaerythritol penta- and hexa(meth)acrylates are preferred, and dipentaerythritol penta- and hexaacrylates are more preferred.

It is preferable that the composition containing an active energy ray-curable resin such as a photocurable resin include a photopolymerization initiator. The photopolymerization initiator is not particularly limited, and examples thereof include sulfonic acid compounds, diazomethane compounds, sulfonium salt compounds, iodonium salt compounds, disulfone-based compounds, benzophenone compounds, alkylphenone compounds, and the like. Among these, aminoalkylphenone compounds are preferable as the alkylphenone compounds, specific examples thereof being 2-methyl-1-[4-(methylthio)phenyl]-2-morpholinopropan-1-one (for example, Irgacure 907, manufactured by BASF).

The ten-point average roughness (Rzjis) of the electrophotographic member is preferably 0.110 or more, and more preferably 0.120 or more. The upper limit is not particularly limited, and examples thereof include 0.110 to 0.300, 0.120 to 0.250, and 0.120 to 0.200. As a result of measuring the ten-point average roughness Rzjis at a total of eight points obtained by multiplication of four points in the circumferential direction of the electrophotographic member by two points in the direction orthogonal to the circumferential direction, an arithmetic average value of ten-point average roughness Rzjis values measured at eight points is obtained.

Since the ten-point average roughness is within the above-described range, a contact area of a cleaning blade tends to be smaller, resulting in smaller friction.

An example of the application of the electrophotographic member according to the present disclosure includes an electrophotographic belt. Examples of applications of the electrophotographic belt include an intermediate transfer belt and a conveyance transfer belt.

However, the present invention is not limited thereto, and can also be applied to, for example, a conveyance belt that carries and conveys a recording medium such as paper. The electrophotographic member may have an endless shape.

Method for Producing Cylindrical Film

The cylindrical film can be produced, for example, through the following steps (i) to (iii). The cylindrical film is preferably a blow molded article. The cylindrical film is also preferably a biaxially stretched cylindrical film.

Step (i): A preform with a test tube shape is molded using a resin mixture containing a crystalline polyester, an amorphous polyester, and roughness forming particles.

Step (ii): The obtained preform is stretched in the axial direction of the preform using a stretching rod, and the preform is filled by the introduction of gas and stretched in the circumferential direction to perform stretching molding in a biaxial direction of the axial direction and circumferential direction; thereby, a bottle-shaped molded article (hereinafter, also referred to as a "blow bottle") is obtained (biaxial stretching blow molding).

Step (iii): Both ends of the obtained blow bottle are cut to obtain a cylindrical film with an endless shape.

The specific means at the step (i) is not particularly limited, and examples thereof include the following means.

First, pellets of a resin mixture containing a crystalline polyester, an amorphous polyester, and roughness forming particles are prepared.

For example, pellets can be prepared by the following method. First, an amorphous polyester and roughness forming particles are melt-kneaded to prepare an amorphous polyester mixture. Next, the obtained amorphous polyester mixture and a crystalline polyester are mixed with each other, and the mixture is further melt-kneaded to prepare pellets of the resin mixture.

As a result, the amorphous polyester easily extends around the roughness forming particles. As described above, in the cylindrical film according to the present disclosure, voids are filled with the amorphous polyester ejected from the crystalline part with the crystallization of the crystalline polyester. Therefore, by increasing the existence proportion of the amorphous polyester around the roughness forming particles, the effects can be more easily exhibited.

In a case where the amorphous polyester mixture is melt-kneaded with the crystalline polyester, it is preferable to knead the mixture at the following temperature. That is, it is preferable to knead a polyester of the crystalline polyester or the amorphous polyester contained in the resin mixture, the polyester having the highest melting point or softening point at a temperature equal to or higher than the highest temperature or softening point, so that the polyester is well kneaded.

A kneading method is not particularly limited, and a single screw extruder, a twin-screw kneading extruder, a Banbury mixer, a roll, the Blabender, the Plastograph, a kneader, and other kneading methods can be used.

The obtained resin mixture is used to mold a preform with a test tube shape. A method for molding the preform is not particularly limited, and examples thereof include the following methods.

Figure 2:
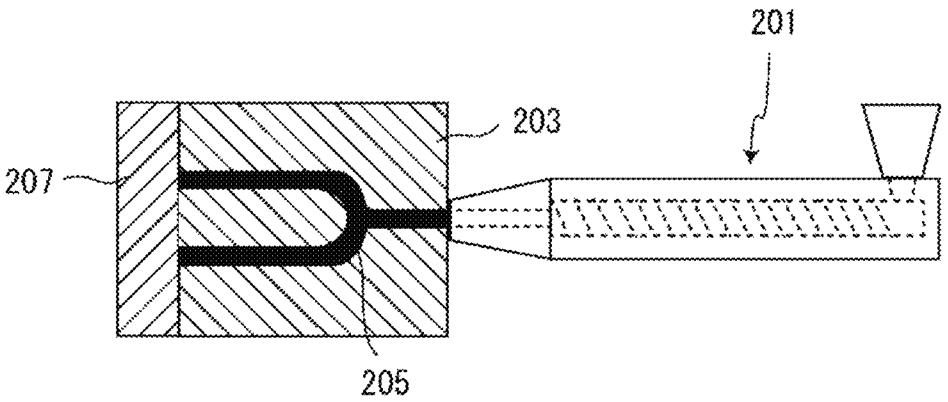
FIG. 2 is a schematic cross-sectional view of an injection molding apparatus used in Examples.

As illustrated in FIG. 2, the method includes a method of injecting a melt of the resin mixture into a preform molding mold including a cavity mold 203 and a core mold 207 by using an injection molding apparatus 201, and solidifying the melt in the preform molding mold to mold a preform 205.

At this point, the temperature of the preform molding mold into which the melt is injected is preferably, for example, 40° C. or lower. The melt injected into the mold is cooled and solidified in the mold, but proceeding with the crystallization of the crystalline polyester can be delayed by rapid cooling of the melt.

Since the crystallization of the crystalline polyester in the preform is delayed, it is possible to more accurately control the crystal orientation of the crystalline polyester in the biaxial direction in the biaxial stretching blow molding at the step (ii).

Figure 3A:
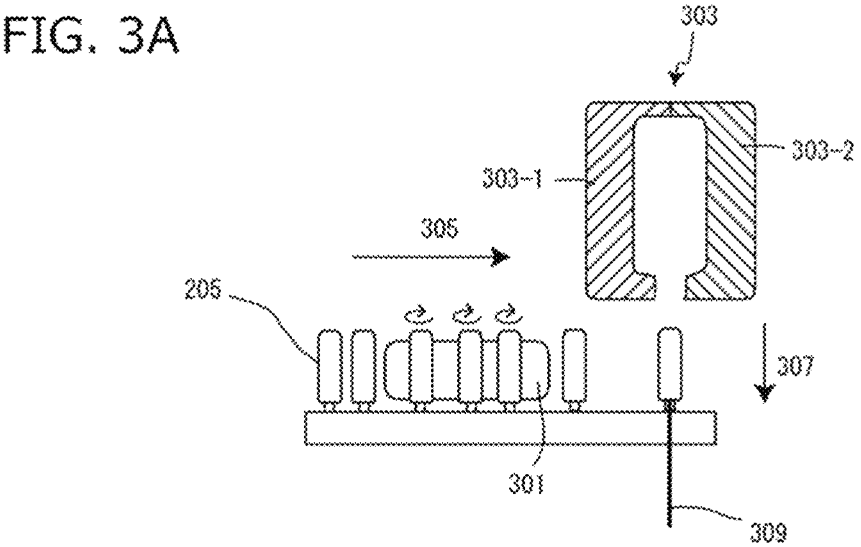
FIGS. 3A to 3D are schematic cross-sectional views of a primary blow molding apparatus used in Examples.

Next, at the step (ii), the biaxial stretching blow molding is performed to stretch the preform with a test tube shape in the longitudinal direction and the radial direction. First, as illustrated in FIG. 3A, a preform 205 is placed in a heating device 301 and heated to a temperature at which the preform can be stretched. The temperature at which the preform can be stretched is, for example, 100° C. to 160° C.

The heating time at this point is preferably 5 minutes or less, and more preferably 1 minute or less. By setting the heating time to 5 minutes or less, it is possible to delay the proceeding with the crystallization of the crystalline polyester in the preform during the heating.

Figure 3B:
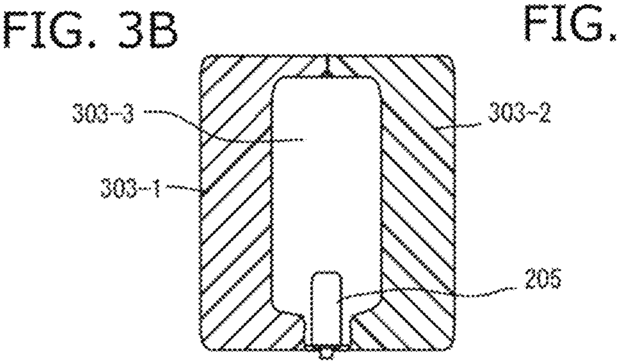

The heated preform is conveyed in the direction of an arrow 305. Next, a blow mold 303 including a left mold 303-1 and a right mold 303-2, which are combined to form a cylindrical cavity 303-3 therein, is lowered in the direction along an arrow 307 from immediately above the heated preform 205. Then, as illustrated in FIG. 3B, the preform 205 is disposed at an opening portion of the blow mold 303.

It is preferable to place the preform heated in a short time (for example, within 20 seconds) at the opening portion of the blow mold so that the temperature of the heated preform does not decrease until the start of the next biaxial stretching step. As a result, it possible to delay the proceeding with the crystallization of the crystalline polyester in the preform by slow cooling of the preform.

The heating temperature of the preform in the heating device is not particularly limited as long as the preform can be stretched. For example, the heating temperature of the preform may be calculated in advance using a differential scanning calorimetry (DSC) measurement device with respect to a resin mixture as a constituent material of the preform while observing an endothermic peak and a shift of a base line at the time of temperature rise, or may be determined from a glass transition temperature (Tg).

Figure 3C:
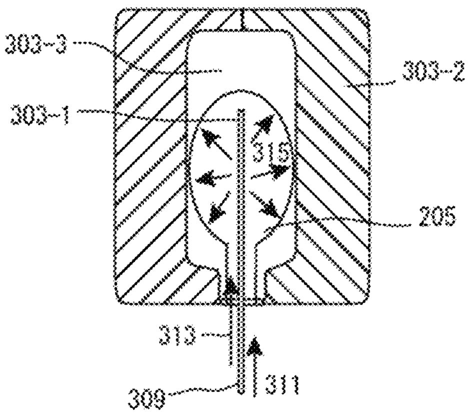

Subsequently, the heated preform 205 placed in the blow mold 303 is stretched in the longitudinal direction of the preform 205 by a stretching rod 309 being driven in the direction of an arrow 311 as illustrated in FIG. 3C. This stretching is referred to as a primary stretching.

In addition, gas is allowed to flow into the preform from an opening portion of the preform 205 (arrow 313), and the preform is expanded in the circumferential direction thereof. This is referred to as a secondary stretching. Examples of the gas to be blown include air, nitrogen, carbon dioxide, and argon. As a result, the preform 205 expands in each of the directions indicated by arrows 315 in FIG. 3C, is brought into close contact with the inner wall of the cavity 303-3, and is cooled and solidified in this state.

The secondary stretching may be performed subsequently to the primary stretching, but it is preferable that the primary stretching and the secondary stretching are performed almost concurrently by synchronization of the driving of the stretching rod at the primary stretching step with the inflow of gas into the preform.

Next, the blow bottle is taken out from the blow mold 303 by separating the right mold 303-1 and the left mold 303-2 of the blow mold 303. According to such step (ii), the amorphous polyester extends in the first direction and the second direction around at least the roughness forming particles.

In this biaxial stretching blow molding step, αp and αa can be adjusted to the above-described range by adjustment of the stretching ratio in the axial direction and the circumferential direction of the preform.

Figure 3D:
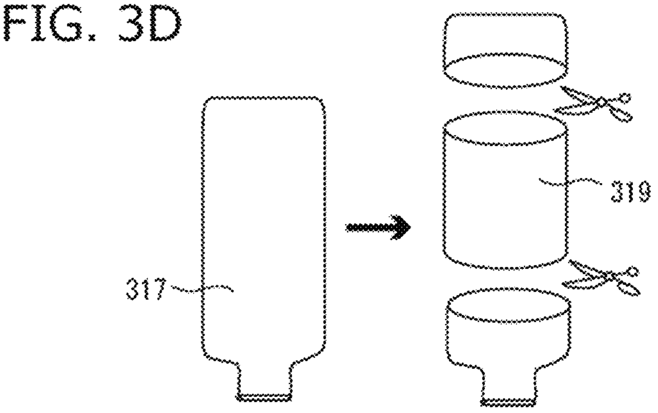

Next, as illustrated in FIG. 3D, a part of the opening portion side of a blow bottle 317 obtained and a part of an upper end opposite to the opening portion side are cut to obtain a biaxially stretched cylindrical film 319 as a base layer.

Before the blow bottle 317 is cut, heat treatment may be performed as necessary to adjust the roughness of an outer circumferential surface of the blow bottle or to finely adjust the crystallinity of the crystalline polyester.

Figure 4:
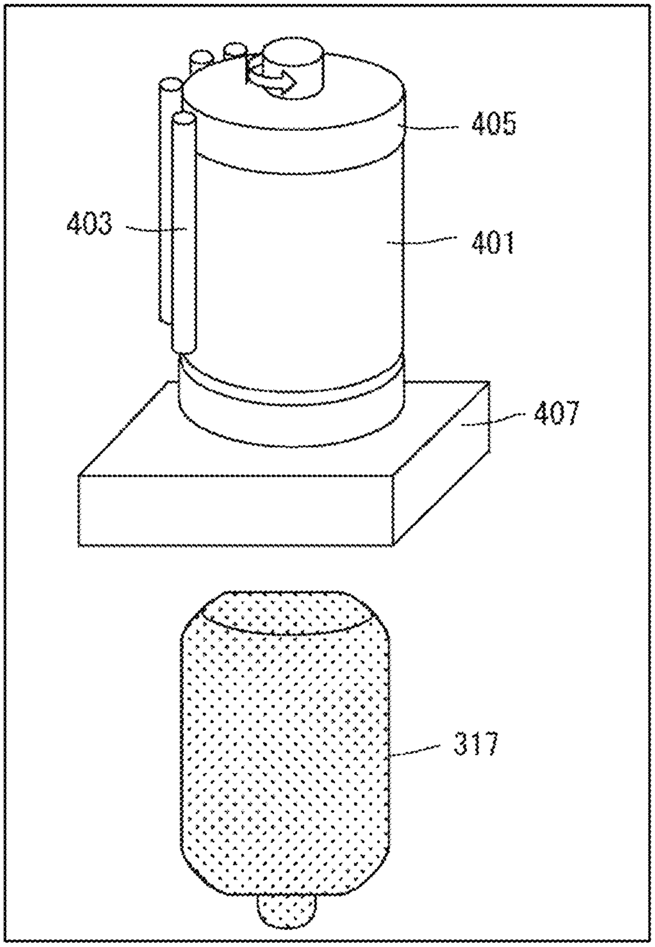
FIG. 4 is a schematic cross-sectional views of a secondary blow molding apparatus used in Examples.

Specifically, for example, as illustrated in FIG. 4, the blow bottle 317 is placed in a cylindrical mold 401, an outer mold 405 is then attached, and the blow bottle is filled with gas. Then, outer molds are attached to the upper part and the lower part of the mold 401 so that the gas inside the blow bottle is not leak. This is placed on a rotation table 407, and the mold 401 is heated by roller-shaped heaters 403 in contact with the outer circumferential surface of the metal mold 401 while being rotated. Examples of the heating temperature include 130° C. to 190° C., and examples of the heating time include heating the entire circumference of the blow bottle uniformly for about 60 seconds.

Electrophotographic Image Forming Apparatus

An example of an electrophotographic image forming apparatus including an electrophotographic member as an intermediate transfer belt according to at least one aspect of the present disclosure will be described below.

The electrophotographic image forming apparatus has a so-called tandem configuration in which electrophotographic stations of multiple colors are arranged side by side in the rotation direction of the intermediate transfer belt (FIG. 1). In the following explanation, the suffixes Y, M, C, and k are attached to the symbols of the configurations of yellow, magenta, cyan, and black colors, respectively, but the suffixes are in some cases omitted for similar configurations.

In FIG. 1, charging devices 2Y, 2M, 2C, and 2*k*, exposure devices 3Y, 3M, 3C, and 3*k*, developing devices 4Y, 4M, 4C, and 4*k*, and an intermediate transfer belt (intermediate transfer member) 6 are arranged around photosensitive drums (photosensitive bodies, image carriers) 1Y, 1M, 1C, and 1*k and cleaning devices* 11*Y,* 11*M,* 11*C, and* 11*k.*

The photosensitive drum 1 is rotationally driven in the direction of arrow F (counterclockwise) at a predetermined circumferential speed (process speed). The charging device 2 charges the circumferential surface of the photosensitive drum 1 to a predetermined polarity and potential (primary charging). A laser beam scanner as the exposure device 3 outputs laser light that is on/off modulated according to image information input from an external device such as an image scanner, computer, or the like (not shown), and performs scanning exposure of the charged surface of the photosensitive drum 1. Through this scanning exposure, an electrostatic latent image corresponding to the target image information is formed on the surface of the photosensitive drum 1.

The developing devices 4Y, 4M, 4C, and 4*k* each contain toner of the corresponding color component of yellow (Y), magenta (M), cyan (C), and black (k). The developing device 4 to be used is selected based on the image information, a developer (toner) is developed on the surface of the photosensitive drum 1, and the electrostatic latent image is visualized as a toner image. In this embodiment, a reversal development method is used in which toner is caused to adhere to the exposed portion of the electrostatic latent image for development. Further, such charging device, exposure device, and developing device constitute an electrophotographic image forming means.

Further, the intermediate transfer belt 6 is composed of an electrophotographic belt having an endless shape. The intermediate transfer belt 6 is tensioned around a plurality of rollers 20, 21, and 22 so that the outer circumferential surface of the belt is in contact with the surface of the photosensitive drum 1. In this embodiment, the roller 20 is a tension roller that controls the tension of the intermediate transfer belt 6 to be constant, the roller 22 is a driving roller for the intermediate transfer belt 6, and the roller 21 is an opposing roller for secondary transfer. The intermediate transfer belt 6 is rotated in the direction of arrow G by the drive of the roller 22. Furthermore, primary transfer rollers 5Y, 5M, 5C, and 5*k* are arranged at respective primary transfer positions facing the photosensitive drum 1 with the intermediate transfer belt 6 interposed therebetween.

That is, the electrophotographic image forming apparatus includes a plurality of rollers for tensioning and rotating the electrophotographic belt, and the rollers are arranged in contact with the inner circumferential surface of the electrophotographic belt.

The unfixed toner images of each color formed on the photosensitive drum 1 are sequentially electrostatically primary transferred onto the intermediate transfer belt 6 by applying a primary transfer bias having a polarity opposite to the charging polarity of the toner to the primary transfer roller 5 by using a constant voltage source or a constant current source (not shown). Then, a full-color image in which unfixed toner images of four colors are superimposed on the intermediate transfer belt 6 is obtained. The intermediate transfer belt 6 rotates while bearing the toner image transferred from the photosensitive drum 1 in this manner. After each rotation of the photosensitive drum 1 after the primary transfer, the surface of the photosensitive drum 1 is cleaned of untransferred toner by a cleaning device 11, and the image forming process is repeated.

Further, at a secondary transfer position of the intermediate transfer belt 6 facing the transport path of the recording material 7 as a transfer medium, a secondary transfer roller (transfer portion) 9 is placed in pressure contact with the toner image bearing surface side of the intermediate transfer belt 6. Further, on the back side of the intermediate transfer belt 6 at the secondary transfer position, the opposing roller 21 is provided which serves as an opposing electrode of the secondary transfer roller 9 and to which a bias is applied.

When transferring the toner image on the intermediate transfer belt 6 to the recording material 7, a bias of, for example, −1000 V to −3000 V having the same polarity as that of the toner is applied to the opposing roller 21 by a secondary transfer bias applying means 28 so that a current of −10 μA to −50 μA flows. The transfer voltage at this time is detected by a transfer voltage detection means 29. Furthermore, a cleaning device (blade cleaner) 12 that removes toner remaining on the intermediate transfer belt 6 after the secondary transfer is provided downstream of the secondary transfer position.

The recording material 7 is transported in the direction of arrow H through the transport guide 8 and introduced into the secondary transfer position. The recording material 7 introduced into the secondary transfer position is transported while being nipped at the secondary transfer position, and at this time, a constant voltage bias (transfer bias) controlled to a predetermined value is applied by the secondary transfer bias applying means 28 to the opposing roller 21 of the secondary transfer roller 9. By applying a transfer bias having the same polarity as the toner to the opposing roller 21, the four-color full-color image (toner image) superimposed on the intermediate transfer belt 6 is transferred at once to the recording material 7 at the transfer site, and a full-color unfixed toner image is formed on the recording material. The recording material 7 to which the toner image has been transferred is introduced into a fixing device (not shown) and is heated and fixed.

EXAMPLES

Hereinafter, the present disclosure will be specifically described with reference to Examples and Comparative Examples, but the present disclosure is not limited thereto.

Materials used to produce the electrophotographic members according to Examples and Comparative Examples are shown below.

TABLE 1

| Abbreviation | Material name (Trade name and other details) |
|---|---|
| Crystalline polyester 1 (cPES1) | Polyethylene terephthalate (Trade name: TRN-8550FF, Manufactured by TEIJIN LIMITED) |
| Crystalline polyester 2 (cPES2) | Polyethylene naphthalate Trade name: TN-8050SC, Manufactured by TEIJIN LIMITED) |
| Amorphous polyester 1 (aPES1) | Amorphous polyester Trade name: VYLON GK640, Manufactured by TOYOBO CO., LTD.) |
| Amorphous polyester 2 (aPES2) | Amorphous polyester (Trade name: VYLON GK880, Manufactured by TOYOBO CO., LTD.) |
| Particles 1 (Fi1) | Cyclic silicon particles_2 μm (Trade name: TOSPEARL 120, Manufactured by Momentive Performance Materials Japan LLC) |
| Particles 2 (Fi2) | Cyclic silica_2 μm (Trade name: SO-C6, Manufactured by ADMATECHS COMPANY LIMITED) |
| Particles 3 (Fi3) | Cyclic silica_0.5 μm Trade name: SO-C2, Manufactured by ADMATECHS COMPANY LIMITED) |
| Ionic conducting agent (IC) | Lithium bis(trifluoromethanesulfonyl)imide Trade name: EF-N115, Manufactured by Mitsubishi Materials Electronic Chemicals Co., Ltd.) |
| Ionic conductive elastomer (ES) | Polyetheresteramide (Trade name: PELESTAT NC6321, Manufactured by SANYO CHEMICAL INDUSTRIES, LTD.) |

Physical properties of the materials in the table are as follows.

- TRN-8550FF: A weight-average molecular weight of 50,000 to 80,000
- TN-8050SC: A weight-average molecular weight of 20,000 to 80,000
- VYLON GK640: Having a structure corresponding to ethylene terephthalate and a structure corresponding to propylene terephthalate, a weight-average molecular weight of 10,000 to 40,000
- VYLON GK880: Having a structure corresponding to ethylene terephthalate and a structure corresponding to propylene terephthalate, a weight-average molecular weight of 10,000 to 40,000

In the table, the particle diameter of the particles also indicates a volume average particle diameter.

TABLE 2

| Abbreviation | Material name (Trade name and other details) |
|---|---|
| AN | Dipentaery thritol penta- and hexa-acrylate (Trade name: ARONIX M-402,Manufactured by TOAGOSEI CO., LTD.) |

TABLE 2-continued

| Abbreviation | Material name (Trade name and other details) |
|---|---|
| PTFE | PTFE particles<br>(Trade name: Lubron L-2,Manufactured by DAIKIN INDUSTRIES, LTD.) |
| GF | PTFE particle dispersant<br>(Trade name: GF-300,Manufactured by TOAGOSEI CO., LTD.) |
| SL | Zinc antimonate particle slurry<br>(Trade name: Celnax CS-Z240K,Manufactured by Nissan Chemical Corporation, 40 mass % as zinc antimonate particle slurry component) |
| IRG | Photoinitiator<br>(Trade name: Irgacure 907, manufactured by BASF SE) |

Method for Measuring Characteristic Value and Method for Evaluating Characteristic Value A method for measuring and evaluating the characteristic values of the electrophotographic belts according to Examples and Comparative Examples are as follows (1) to (5).

(Evaluation 1) Evaluation of Shrinkage Rate

As an index of the shrinkage stress of a cylindrical film of an electrophotographic belt, a shrinkage rate was measured by the following method. The shrinkage rate was measured using a thermomechanical analyzer (trade name: TMA/SDTA841 type; manufacture by Mettler-Toledo International, Inc.), with a change in distance between chucks considered as a dimensional change of a sample under the following measurement conditions.

From the produced electrophotographic belt, a test piece A of 5 mm in the circumferential direction×20 mm in the direction orthogonal to the circumferential direction and a test piece B of 20 mm in the circumferential direction×5 mm in the direction orthogonal to the circumferential direction were cut out and used. A thickness of each test piece was the total thickness of the electrophotographic belt. Since a surface layer containing a (meth)acrylic resin does not substantially affect the value of the shrinkage rate, the test pieces used for this evaluation were subjected to this evaluation while including the surface layer.

Each test piece was gripped to set a distance between chucks to 10 mm and a load to 0.01 N, and held at 25° C. for 10 minutes. Thereafter, the temperature was raised to a temperature 10° C. higher than the glass transition temperature of the test pieces at 5° C./min, held for 30 minutes, and then lowered again to 25° C. at 5° C./min.

Assuming that the distance between chucks before the temperature rise was x1 and the distance between chucks at the end was x2, a shrinkage rate α (unit: %) was calculated by the following equation.

$$\alpha = (x1 - x2)/x1 \times 100$$

An arithmetic average value was obtained from the measurement result of each of five test pieces cut out from the same electrophotographic belt, an average value of the measurement result obtained using the test piece B was defined as a shrinkage rate αp in the circumferential direction of the electrophotographic belt, and an average value of the measurement result obtained using the test piece A was defined as a shrinkage rate αa in the direction orthogonal to the circumferential direction of the electrophotographic belt. In a case where expansion occurred, a value of the shrinkage rate was expressed as minus.

(Evaluation 2) Evaluation of Tensile Elastic Modulus

The tensile elastic modulus was measured in an environment of a temperature of 23° C. and a relative humidity of 50% with a universal material testing machine for low load (trade name: 34TM-5; manufactured by Instron Corporation) with a built-in 5 kN load cell.

From the produced electrophotographic belt, a test piece 1 of 100 mm in the circumferential direction thereof×20 mm in the longitudinal direction and a test piece 2 of 20 mm in the circumferential direction×100 mm in the longitudinal direction were cut out and used. A thickness of each test piece was the total thickness of the electrophotographic belt. The surface layers of the test pieces were not removed because those did not affect the measured values.

Then, each test piece was gripped with a pneumatic gripper at a distance between chucks of 50 mm. The gripped test piece was pulled at a constant speed of 5 mm/min, and the tensile elastic modulus was calculated from the obtained stress-strain curve and the thickness of the cylindrical film, using the stress value at 0.25% strain.

An arithmetic average value was obtained from the measurement result of each of five test pieces cut out from the same electrophotographic member, an average value of the measurement result obtained using the test piece 1 was defined as a tensile elastic modulus Ep in the circumferential direction of the cylindrical film, and an average value of the measurement result obtained using the test piece 2 was defined as a tensile elastic modulus Ea in the direction orthogonal to the circumferential direction of the cylindrical film.

(Evaluation 3) Evaluation of Ten-Point Average Roughness

The ten-point average roughness (Rzjis) of the outer surface of the electrophotographic belt was evaluated by the following method. As a measurement device, a surface roughness measuring machine (trade name: SURFCOM 1500SD, manufactured by TOKYO SEIMITSU CO., LTD.) was used. Rzjis was measured in accordance with Japanese Industrial Standards (JIS) B0601:1994 under the conditions of a cut-off wavelength of 0.25 mm, a measurement reference length of 0.25 mm, and a measurement length of 1.25 mm. Here, Rzjis was measured for a total of eight points obtained by multiplication of four points in the circumferential direction by two points in the direction orthogonal to the circumferential direction with respect to one electrophotographic member randomly selected by moving the stylus of a measuring instrument with respect to the outer surface along the longitudinal direction of the electrophotographic belt. The arithmetic average value of the ten-point average roughness Rzjis values measured at eight points was defined as the ten-point average roughness of the electrophotographic member. The measurement position was determined at any position in a central region of 100 mm (width: 200 mm) from the center in the longitudinal direction of the electrophotographic belt toward both ends in the longitudinal direction.

(Evaluation 4) Evaluation of Surface Resistivity

The surface resistivity of the electrophotographic belt was measured according to a method in accordance with Japanese Industrial Standards (JIS) K6911:2006, as follows.

As a measurement device, a high resistance meter (trade name: Hiresta UP MCP-HT450, manufactured by Nittoseiko Analytech Co., Ltd. (former name: Mitsubishi Chemical Analytech Co., Ltd.)) was used. As the probe, a probe (trade name: UR-100, manufactured by Nitto Seiko Analytech Co., Ltd. (former name: Mitsubishi Chemical Analytech Co., Ltd.)) having an inner diameter of a main electrode of 50 mm, an inner diameter of a guard ring electrode of 53.2 mm, and an outer diameter of 57.2 mm was used.

The surface resistivity is a surface resistance value per unit area (1 $cm^2$) of the electrophotographic member, and the unit is indicated as [Ω/□ ].

The produced electrophotographic belt was left to stand for 24 hours in an environmental test chamber controlled at a temperature of 23° C. and a relative humidity of 50%. Thereafter, a voltage of 250 V was applied to the inner surface of the electrophotographic belt for 10 seconds under an environment of a temperature of 23° C. and a relative humidity of 50%, and the surface resistivity of this electrophotographic belt at four positions in the circumferential direction was measured. The arithmetic average value of the obtained surface resistivity was used as a surface resistivity A of the electrophotographic belt at normal temperature and normal humidity.

(Evaluation 5) Evaluation of Peeling Resistance

An electrophotographic image forming apparatus illustrated in FIG. 1 was used to evaluate peeling resistance as follows.

Under an environment of a temperature of 25° C. and a relative humidity of 50%, the electrophotographic belt was tightly stretched around rollers, with a cleaning blade being in contact with the outer surface of the electrophotographic belt. Thereafter, the electrophotographic belt was rotated 150,000 times at a driving speed of 150 mm/sec, and the presence or absence of peeling of the electrophotographic belt was visually confirmed. Then, in a case where there was peeling, the level difference at the peeling position was measured.

For the measurement on the level difference, a surface roughness measuring machine (trade name: SURFCOM 1500SD, manufactured by TOKYO SEIMITSU CO., LTD.) was used. The parameter of a level difference D was measured at a cut-off wavelength of 0.25 mm, and a measurement length that is any length longer than a peeled portion. From the measurement result, the number of peeled portions was measured at positions where the level difference was larger than the thickness of the surface layer.

As a cleaning blade 12 illustrated in FIG. 1, a cleaning blade made of a polyurethane elastomer having a durometer hardness of 770 measured by a method in accordance with Japanese Industrial Standards (JIS) K6253-3 was used. As an attachment position, a setting angle θ (angle formed between a tangential point of a tension roller 22 and the cleaning blade 12 at the intersection portion between an electrophotographic member 6 and the cleaning blade 12) was 24°, a penetration level 6 (the length of the cleaning blade 12 in the thickness direction overlapping with the tension roller 22) was 1.5 mm, and a contact pressure of the cleaning blade 12 was 0.6 N/cm.

In addition, before the number of rotations reached 150,000, the electrophotographic member was close to one end portion, and the presence or absence of occurrence of drive failure due to buckling or other abnormality was also evaluated.

(Evaluation 6) Measurement of Volume Average Particle Diameter of Roughness Forming Particles The volume average particle diameter of the roughness forming particles was measured by the following procedure.

A specimen having a length of 5 mm, a width of 5 mm, and a thickness as the total thickness of the cylindrical film was collected from any position of the electrophotographic belt. This specimen was baked at a temperature of 400° C. for 2 hours under a nitrogen atmosphere to ash the crystalline polyester and the amorphous polyester; thereby, an ash product was obtained.

Subsequently, 16 g of sucrose (manufactured by Kishida Chemical Co., Ltd.) was added to 10 mL of ion-exchange water, and the sucrose was dissolved in a hot water bath to prepare a sucrose concentrate. To a tube for centrifugation (volume: 50 mL) were added 26 g of the sucrose concentrate and 1.0 g of the ash product obtained above. Subsequently, the tube for centrifugation was shaken using a shaking system universal shaker (trade name: AS-1N; manufactured by AS ONE Corporation) at 300 spm (strokes/minute) for 20 minutes. After shaking, the solution in the tube for centrifugation was transferred into a glass tube for a swing rotor (50 mL) and centrifuged by a high speed cooling centrifuge (trade name: H-9R; manufactured by KOKUSAN Co., Ltd.) at 3500 rpm for 30 minutes. As a result, roughness forming particles were separated from the ash product. The separated roughness forming particles were collected, and the obtained roughness forming particles were filtered with a reduced pressure filter and then dried in a dryer for 1 hour to obtain a specimen for particle diameter measurement.

This operation was performed multiple times to secure the required amount.

The volume average particle diameter of the roughness forming particles was measured with a particle size distribution meter that calculates an average particle diameter using the dynamic light scattering method (trade name: FPAR-1000; manufactured by Otsuka Electronics Co., Ltd.). The measurement specimen obtained by the above-described method was dispersed in isopropyl alcohol. As the measurement conditions, a temperature of 23° C., a refractive index of 1.3749, and a viscosity of 1.77 mPa·s, referring to the value of isopropyl alcohol as a dispersion medium, were used, and the analysis mode was set to the Cumulant method to measure the volume average particle diameter of the roughness forming particles.

(Evaluation 7) Confirmation of Protruded Portions on Surface Layer

The fact that the surface layer had protruded portions caused by the roughness forming particles on the outer surface opposite to the surface facing the cylindrical film was determined based on the fact that the protruded portions caused by the roughness forming particles was existing on the outer surface of the surface layer, provided that in the SEM image, the protruded portions caused by the roughness forming particles existed on the outer surface of the cylindrical film, and according to the protruded portions, protruded portions were formed on the outer surface of the surface layer.

(Evaluation 8) Confirmation of Existence State of Amorphous Polyester

The fact that the amorphous polyester was extending in the first direction and the second direction around at least the roughness forming particles was confirmed by the following procedure.

A test piece was cut out from any portion of the electrophotographic belt, the test piece having a length of 5 mm in a direction along the circumferential direction of the electrophotographic belt, a length of 5 mm in a direction along the longitudinal direction orthogonal to the circumferential direction, and a thickness equal to the total thickness of the electrophotographic belt. Each of a first cross-section of the obtained test piece in a direction along the circumferential direction of the electrophotographic belt and a second cross-section of the obtained test piece in a direction along the longitudinal direction was polished using a cross-section polisher.

The polished first cross-section and second cross-section of the test piece were stained with ruthenium tetroxide, which can stain amorphous portions. Next, the first cross-section and the second cross-section were observed by scanning electron microscope (SEM) observation, one of roughness forming particles was focused, and an SEM image of a 10 μm×10 μm region including the roughness-formed particle and the periphery thereof was acquired. In this SEM image, the stained region was determined as a region containing the amorphous polyester. Then, in the SEM image obtained from the first cross-section, two points at both ends in the circumferential direction around the roughness forming particle in the stained region were specified, and an angle (acute angle) θ701 formed between a line segment connecting the two points and a straight line drawn parallel to the circumferential direction was measured.

Similarly, in the SEM image obtained from the second cross-section, two points at both ends in the longitudinal direction around the roughness forming particle in the stained region were also specified, and an angle (acute angle) θ702 formed between a line segment connecting the two points and a straight line drawn parallel to the longitudinal direction was measured. The measurement results are illustrated in Table 2. In a case where θ701 was 10° or less, it was determined that the amorphous polyester was existing to extend in the first direction. In addition, in a case where θ702 was 10° or less, it was determined that the amorphous polyester was existing to extend in the second direction.

Example 1

Production of Cylindrical Film

A preblended sample was prepared by mixing cPES1 and aPES1 in Table 1 at the mixing ratio in Table 3. This preblended sample, and Fi1, IC, and ES described in Table 1 were melt-kneaded so as to have the mixing ratio described in Table 3 with a biaxial extruder (trade name: TEX30a, manufactured by The Japan Steel Works, Ltd.) to prepare a resin mixture. The melt-kneading temperature was adjusted to be within a range of 270° C. to 320° C., and the thermal melt-kneading time was set to 3 to 5 minutes.

The obtained resin mixture was pelletized, and the obtained pellets were dried at a temperature of 140° C. for 10 hours.

Next, the obtained pellets were charged into an injection molding apparatus (trade name: SE180D, manufactured by Sumitomo Heavy Industries, Ltd.). Then, a cylinder set temperature was set to 270° C. to 320° C., the preform was molded by injection molding into a test tube shaped mold having a temperature adjusted to 30° C. The obtained preform had a test tube shape with an outer diameter of 50 mm, an inner diameter of 46 mm, a length of 150 mm, and a thickness of 2 mm.

Next, the above-described preform was stretched in a biaxial direction of the axial direction and circumferential direction thereof using a biaxial stretching molding apparatus.

First, as illustrated in FIG. 3A, a preform 205 was placed in a heating device 301 including a non-contact heater (not illustrated) for heating the preform 205, and heated by the heater so that the outer surface temperature of the preform was 120° C. to 160° C.

Next, a blow mold 303 whose mold temperature was maintained at 30° C. was lowered in the direction of an arrow 307 with respect to the heated preform 205, and the heated preform 205 was disposed at the opening portion of the blow mold 303 (FIG. 3B).

Subsequently, as illustrated in FIG. 3C, a stretching rod 309 was driven in the direction of an arrow 311, and almost concurrently with the start of driving of the stretching rod, air whose temperature was controlled to a temperature of 23° C. was introduced into the preform 205 from the opening portion thereof as illustrated by an arrow 313 in FIG. 3C. In this way, the preform 205 was stretched in the biaxial direction and brought into close contact with the inner wall of the blow mold. The drive speed of the stretching rod 309 was 2.0 μm/sec, and the pressure of the air introduced into the blow bottle was 0.5 MPa.

Next, a bottle-shaped molded article (blow bottle) 317 was taken out from the blow mold 303 by separating a right mold 303-1 and a left mold 303-2 of the blow mold 303.

Next, a blow bottle 317 obtained above was set in a nickel cylindrical mold 401 manufactured by electroforming illustrated in FIG. 4, and an outer mold 405 was attached thereto. An air pressure of 0.1 MPa was applied to the inside of the blow bottle to adjust the air so as not to leak to the outside, thereby the outer circumferential surface of the blow bottle 317 being brought into close contact with the inner circumferential surface of the cylindrical mold. Furthermore, the entire circumference of the blow bottle was uniformly heat-treated at 130° C. to 190° C. for 60 seconds by using the heater 403 for heating while the nickel cylindrical mold 401 is rotated at a constant speed of 2 rotations/second.

Thereafter, air at a temperature of 25° C. was blown against this nickel cylindrical mold to cool the mold to normal temperature (25° C.), the pressure of the air applied in the blow bottle 317 was released to obtain the blow bottle 317 whose dimension was improved by annealing. From the dimensions of the preform 205 and the blow bottle 317, the biaxial stretching ratios included a lateral stretching ratio (the circumferential direction) Lp of 4.0 times and a longitudinal stretching ratio (the direction orthogonal to the circumferential direction) La of 3.8 times.

Next, as illustrated in FIG. 3D, a part of the opening portion side of the blow bottle 317 and a part opposite to the part of the opening portion side were cut to prepare a cylindrical film having a circumferential length of 628 mm, a width of 250 mm, and a thickness of 70 μm.

Preparation of Coating Liquid for Forming Surface Layer

A (meth)acrylic resin composition described in Table 2 was weighed at a ratio of AN/PTFE/GF/SL/IRG=66/20/1.0/12/1.0 (mass ratio in terms of solid content) to obtain a solution subjected to a coarse dispersion treatment. The obtained solution was dispersed using a high pressure emulsifying disperser (trade name: NanoVater, manufactured by YOSHIDA KIKAI CO., LTD.). This dispersion treatment was performed until the 50% average particle diameter of PTFE contained therein became 200 nm. The obtained dispersion liquid was used as a coating liquid for forming a surface layer (a mixture containing an active energy ray-curable resin such as a photocurable resin).

Formation Example of Surface Layer

The prepared cylindrical film was fitted into the outer circumference of a cylindrical mold (circumferential length: 628 mm), an end portion was sealed, and the entire mold was immersed in a container filled with the coating liquid for forming a surface layer and pulled up so that the liquid level of a curable composition and the relative speed of the cylindrical film were constant. In this way, a coating film containing the coating liquid was formed on a surface of the cylindrical film.

In the present example, the pulling speed was set to 10 to 50 mm/sec, and the film thickness of the surface layer was adjusted to 3 μm. The cylindrical film coated with the coating liquid was removed from the cylindrical mold, and dried for 1 minute under an environment of 23° C. and exhaust air. The drying temperature and the drying time were appropriately adjusted depending on the solvent types, the solvent ratio, and the film thickness.

Thereafter, the coating film was irradiated with ultraviolet rays using a UV irradiator (trade name: UE06/81-3, manufactured by EYE GRAPHICS CO., LTD.) until the integrated light amount reached 600 mJ/cm$^2$ to cure the coating film. In this way, an electrophotographic belt according to the present example was produced.

The thickness of the surface layer was measured by a destruction inspection in which a cylindrical film separately prepared under the same conditions was cut, and the cross-section thereof was observed with an electron microscope (trade name: XL30 SFEG, manufactured by FEI Company).

As a result of the destruction inspection, the thickness of the surface layer was 2.8 μm.

The obtained electrophotographic belt was subjected to the above (Evaluation 1) to (Evaluation 8).

Examples 2 and 3

The preform in Example 2 had a test tube shape with an outer diameter of 60 mm, an inner diameter of 56 mm, a length of 180 mm, and a thickness of 2.0 mm. In addition, the preform in Example 3 had a test tube shape with an outer diameter of 40 mm, an inner diameter of 36 mm, a length of 120 mm, and a thickness of 2.0 mm. Electrophotographic belts were produced and evaluated in the same manner as in Example 1, except that the shape of the preform was changed and the material was changed to have the blending amounts illustrated in Table 3.

Examples 4 to 7

Electrophotographic belts were produced and evaluated in the same manner as in Example 1, except that the material was changed to have the blending amounts illustrated in Table 3.

TABLE 3

| Material | Example | | | | | | |
|---|---|---|---|---|---|---|---|
| abbreviation | 1 | 2 | 3 | 4 | 5 | 6 | 7 |
| cPES1 [Mass %] | 80.5 | 80.5 | 80.5 | 74.0 | 0.0 | 0.0 | 20.0 |
| cPES2 [Mass %] | 0.0 | 0.0 | 0.0 | 0.0 | 77.0 | 68.0 | 60.5 |
| aPES1 [Mass %] | 3.0 | 3.0 | 3.0 | 8.0 | 0.0 | 0.0 | 3.0 |
| aPES2 [Mass %] | 0.0 | 0.0 | 0.0 | 0.0 | 5.0 | 12.0 | 0.0 |
| Fi1 [Mass %] | 0.5 | 0.5 | 0.5 | 2.0 | 0.0 | 0.0 | 0.5 |
| Fi2 [Mass %] | 0.0 | 0.0 | 0.0 | 0.0 | 1.0 | 0.0 | 0.0 |
| Fi3 [Mass %] | 0.0 | 0.0 | 0.0 | 0.0 | 0.0 | 3.0 | 0.0 |
| IC [Mass %] | 1.0 | 1.0 | 1.0 | 1.0 | 2.0 | 2.0 | 1.0 |
| ES [Mass %] | 15.0 | 15.0 | 15.0 | 15.0 | 15.0 | 15.0 | 15.0 |

Comparative Examples 1 and 2

Pellets of a resin mixture were obtained in the same manner as in Example 1, except that a preblended sample mixed at a mixing ratio described in Table 4 was used as a material. Subsequently, a preform was prepared in the same manner as in Example 1 using only the pellets of this resin mixture. Subsequently, biaxial stretching molding was performed using this preform in the same manner as in Example 1 to produce a cylindrical film. The electrophotographic member in Comparative Example 2 had a circumferential length of 628 mm, a width of 250 mm, and a thickness of 82 km. In addition, the electrophotographic member in Comparative Example 3 had a circumferential length of 628 mm, a width of 250 mm, and a thickness of 63 km.

The obtained electrophotographic member was subjected to the above (Evaluation 1) to (Evaluation 8).

Comparative Example 3

A preblended sample mixed at a mixing ratio described in Table 4 was used as a material, and melted and mixed under the following conditions using a twin-screw kneading extruder (trade name: PCM43, manufactured by Ikegai Corporation) to prepare a resin mixture.

Extrusion amount: 6 kg/h

Screw rotation speed: 225 rpm

Barrel control temperature: 270° C.

The obtained resin mixture was melt-extruded under the following conditions using a single-screw extruder (manufactured by PLABOR Research Laboratory of Plastics Technology Co., Ltd) equipped with a spiral cylindrical die (inner diameter: 195 mm, slit width: 1.1 mm) at the tip to prepare a cylindrical film having the following size. The cylindrical film thus obtained was used as the electrophotographic member according to Comparative Example 3.

Extrusion amount: 6 kg/h

Die temperature: 270° C.

Size: an outer diameter of 200 mm, a thickness of 70 μm

The obtained electrophotographic member was subjected to the above (Evaluation 1) to (Evaluation 8).

TABLE 4

| Material abbreviation | Comparative Example 1 | Comparative Example 2 | Comparative Example 3 |
|---|---|---|---|
| cPES1 [Mass %] | 83.5 | 81.0 | 80.5 |
| aPES1 [Mass %] | 0.0 | 3.0 | 3.0 |
| Fi1 [Mass %] | 0.5 | 0.0 | 0.5 |

TABLE 4-continued

| Material abbreviation | Comparative Example 1 | Comparative Example 2 | Comparative Example 3 |
|---|---|---|---|
| IC [Mass % ] | 1.0 | 1.0 | 1.0 |
| ES [Mass %] | 15.0 | 15.0 | 15.0 |

The evaluation results of Examples 1 to 7 and Comparative Examples 1 to 3 are illustrated in Tables 5 and 6.

TABLE 5

| Evaluation | | Example 1 | 2 | 3 | 4 | 5 | 6 | 7 |
|---|---|---|---|---|---|---|---|---|
| Lateral stretching ratio Lp [times] | | 4.0 | 3.3 | 5.0 | 4.0 | 4.0 | 4.0 | 4.0 |
| Longitudinal stretching ratio La [times] | | 3.8 | 3.2 | 4.8 | 3.8 | 3.8 | 3.8 | 3.8 |
| Evaluation 1 | Shrinkage rate αp [%] | 5.35 | 3.16 | 6.09 | 4.96 | 5.16 | 4.60 | 5.38 |
| | Shrinkage rab αa [%] | 5.31 | 3.19 | 6.14 | 5.02 | 5.07 | 4.53 | 5.22 |
| Evaluation 2 | Elastic modulus Ep [MPa] | 1673 | 1358 | 1824 | 1617 | 1662 | 1611 | 1681 |
| | Elasto modulus Ea [MPa] | 1665 | 1387 | 1850 | 1602 | 1646 | 1605 | 1675 |
| Evaluation 3 | Rzjis [μm] | 0.143 | 0.138 | 0.140 | 0.178 | 0.158 | 0.122 | 0.144 |
| Evaluation 4 | Surface resistivity A (under environment of temperature of 23° C. and relative humidity of 50%) [Ω/□] | 6.1E+10 | 6.0E+10 | 5.9E+10 | 5.8E+10 | 2.5E+10 | 2.7E+10 | 6.0E+10 |
| Evaluation 5 | Drive failure | Absence | Absence | Absence | Absence | Absence | Absence | Absence |
| | The number of peeling times at 150,000 rotations | 0 | 0 | 0 | 0 | 0 | 0 | 0 |
| Evaluation 6 | Volume average particle diameter of roughness forming particles(μm) | 1.96 | 2.03 | 1.98 | 2.01 | 1.95 | 0.51 | 2.04 |
| Evaluation 7 | Presence or absence of proruded portion | Presence | Presence | Presence | Presence | Presence | Presence | Presence |
| Evaluation 8 | θ701 (°) | 1 | 1 | 1 | 1 | 1 | 1 | 1 |
| | θ702 (°) | 1 | 1 | 1 | 1 | 1 | 1 | 1 |

In the table, for example, 6.1E+10 represents $6.1\times10^{10}$.

TABLE 6

| Evaluation | | Comparative Example 1 | 2 | 3 |
|---|---|---|---|---|
| Lateral stretching ratio Lp [times] | | 4.0 | 4.0 | 1.0 |
| Longitudinal stretching ratio La [times] | | 3.8 | 3.8 | 1.0 |
| Evaluation 1 | Shrinkage rate αp [%] | 5.34 | 5.28 | 0.11 |
| | Shrinkage rate αa [%] | 5.30 | 5.21 | 0.09 |
| Evaluation 2 | Elastic modulus Ep [MPa] | 1661 | 1649 | 856 |
| | Elastic modulus Ea [MPa] | 1656 | 1642 | 853 |
| Evaluation 3 | Rzjis [μm] | 0.139 | 0.023 | 0.095 |
| Evaluation 4 | Surface resistivity A (under environment of temperature of 23° C. and relative humidity of 50%) [Ω/□] | 7.1E+10 | 8.0E+10 | 8.6E+10 |
| Evaluation 5 | Drive failure | Absence | Presence | Presence |
| | The number of peeling times at 150,000 rotations | 15 | 11 | 0 |
| Evaluation 6 | Volume average particle diameter ofroughness forming partides(μm) | 1.98 | — | 2.01 |

TABLE 6-continued

| | Evaluation | Comparative Example 1 | Comparative Example 2 | Comparative Example 3 |
|---|---|---|---|---|
| Evaluation 7 | Presence or absence of protruded portion | Presence | Absence | Presence |
| Evaluation 8 | θ701 (°) | — | — | — |
| | θ702 (°) | — | — | — |

In Comparative Example 1, the amorphous polyester is not contained. That is, it is considered that there were voids around the roughness forming particles contained in the cylindrical film, and peeling occurred starting from the void portions while the electrophotographic member was repeatedly subjected to friction.

In Comparative Example 2, the roughness forming particles are not contained. That is, large unevenness are not formed on the surface of the electrophotographic member, and the ten-point average roughness Rzjis value is thus small. Therefore, since the contact area with the cleaning blade is large, the friction is large. It is thus considered that a drive failure due to a motor torque abnormality occurred during the test.

In Comparative Example 3, the same raw material as in Example 1 was used, but the stretching does not occur. Therefore, the elastic modulus of the electrophotographic member in the circumferential direction and the direction orthogonal to the circumferential direction is significantly low, and the shrinkage rate in the circumferential direction and the direction orthogonal to the circumferential direction is also significantly low. Therefore, wrinkles were generated by tight stretching with the tension roller. In a case where the test was started, the cockling of the electrophotographic member was observed, and the electrophotographic member was buckled to approach one end portion of the tension roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-184603, filed Oct. 27, 2023 which is hereby incorporated by reference herein in its entirety.

What is claimed is:

1. An electrophotographic member with an endless shape, the electrophotographic member comprising:

a cylindrical film; and a surface layer on an outer circumferential surface of the cylindrical film, wherein the cylindrical film has a shrinkage rate αp in a first direction serving as a circumferential direction of the cylindrical film and a shrinkage rate αa in a second direction orthogonal to the circumferential direction, both of which are 2.0% or more;

the cylindrical film comprises a crystalline polyester as a binder, and roughness forming particles dispersed in the binder, the surface layer includes protruded portions caused by the roughness forming particles on an outer surface opposite to a surface facing the cylindrical film, and the cylindrical film further comprises an amorphous polyester, and the amorphous polyester extends in the first direction and the second direction around at least the roughness forming particles.

2. The electrophotographic member according to claim 1, wherein the cylindrical film further comprises an ionic conducting agent, and the ionic conducting agent is comprised in the amorphous polyester.

3. The electrophotographic member according to claim 1, wherein the crystalline polyester comprises at least one selected from the group consisting of polyalkylene terephthalate, polyalkylene naphthalate, and polyalkylene isophthalate, and a copolymer comprising the polyalkylene terephthalate, the polyalkylene naphthalate, and the polyalkylene isophthalate.

4. The electrophotographic member according to claim 1, wherein the amorphous polyester has a structure corresponding to at least one phthalic acid selected from the group consisting of terephthalic acid, orthophthalic acid, and isophthalic acid, and a structure corresponding to at least one diol selected from the group consisting of ethylene glycol, diethylene glycol, propylene glycol, neopentyl glycol, and cyclohexanedimethanol.

5. The electrophotographic member according to claim 1, wherein a content ratio of the amorphous polyester to the crystalline polyester is 30.0 mass % or less.

6. The electrophotographic member according to claim 1, wherein the roughness forming particles comprise at least one selected from the group consisting of silicone resin particles and silica particles.

7. The electrophotographic member according to claim 1, wherein the roughness forming particles have a volume average particle diameter of at least 0.4 μm.

8. The electrophotographic member according to claim 1, wherein the electrophotographic member has a ten-point average roughness of at least 0.110.

9. The electrophotographic member according to claim 1, wherein the cylindrical film is a biaxially stretched cylindrical film.

10. The electrophotographic member according to claim 1, wherein the electrophotographic member is an electrophotographic belt with an endless shape.

11. An electrophotographic image forming apparatus comprising an intermediate transfer belt with an endless shape, wherein the intermediate transfer belt comprises:

a cylindrical film; and a surface layer on an outer circumferential surface of the cylindrical film, the cylindrical film has a shrinkage rate αp in a first direction serving as a circumferential direction of the cylindrical film and a shrinkage rate αa in a second direction orthogonal to the circumferential direction, both of which are 2.0% or more;

the cylindrical film comprises a crystalline polyester as a binder, and roughness forming particles dispersed in the binder, the surface layer includes protruded portions caused by the roughness forming particles on an outer surface opposite to a surface facing the cylindrical film, and the cylindrical film further comprises an amorphous polyester, and the amorphous polyester extends in the first direction and the second direction around at least one of the roughness forming particles.

* * * * *